Sept. 8, 1953  S. MALANOWSKI  2,651,417
OUTWARD FLOW FILTER
Filed May 2, 1944  3 Sheets-Sheet 1

Inventor
Stanley Malanowski
By Arthur Minnick
Attorney

Sept. 8, 1953     S. MALANOWSKI     2,651,417
OUTWARD FLOW FILTER

Filed May 2, 1944     3 Sheets-Sheet 2

Inventor
Stanley Malanowski
By Arthur Klimmick
Attorney

Sept. 8, 1953 S. MALANOWSKI 2,651,417
OUTWARD FLOW FILTER
Filed May 2, 1944 3 Sheets-Sheet 3

Inventor
Stanley Malanowski
By Arthur Minnick
Attorney

Patented Sept. 8, 1953

2,651,417

UNITED STATES PATENT OFFICE 2,651,417

OUTWARD FLOW FILTER

Stanley Malanowski, Tampa, Fla., assignor to Fram Corporation, a corporation of Rhode Island Application May 2, 1944, Serial No. 533,670

3 Claims. (Cl. 210—112)

The primary object of the present invention is to provide a highly efficient filter element having within a small cubic space, a very large surface to receive liquid to be filtered. A further object of the invention is to form the filter element as a closed container arranged so that filtered liquid passes from the interior outward, leaving the dirt within the container to be discarded with the container when replacement of the filter element becomes desirable.

Figure 8:
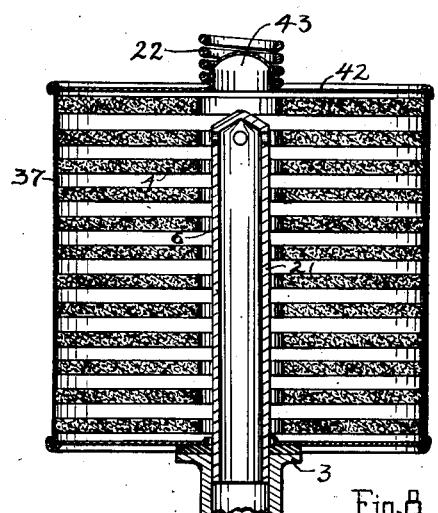

The present invention retains the great efficiency of filtration of the previous form of filter element shown in Fig. 8 of patent to Malanowski, No. 2,269,725, dated January 13, 1942, by an inversion of structure in which the element is made as a closed container having its interior provided with a plurality of porous members of cellulose or other fibrous material exposing many surfaces to oil or other liquid to be filtered, the container having sufficient strength to resist outward pressure of liquid forced into the element through a suitable inlet but the fibrous elements permitting the liquid to enter at all exposed surfaces to the relatively less resistant interior portion of the fibrous members through which the liquid will pass longitudinally outward to escape at the outer surface of the element.

The fibrous material will be made with dense surfaces that will arrest the finest particles in suspension and will allow only clear liquid to pass. The pressure of the liquid will be equal on all surfaces since all the spaces between the members are in communication with each other, but the central portions of the members will be under less pressure than the exposed surfaces since they are open at their edges and free from fine particles so that the fibrous interiors act as passages for the escape of clean liquid.

In any of the forms illustrated in the drawings, the oil carrying dirt and sludge in suspension is forced into the interior spaces within the element. The oil reaches all portions of the interior surfaces and penetrates into the interior of the sheet-like members in proportion to the resistance at any point. Once within the interior of the fibrous members, the oil will move in the direction of least resistance, which is outward, until it emerges at the outer surface of the element. The dirt and sludge stop at the surfaces of the members and gradually fill the interior spaces but none escapes to the outer surface. When the filter element is taken out of its casing, the dirt all goes with it.

Figure 1:
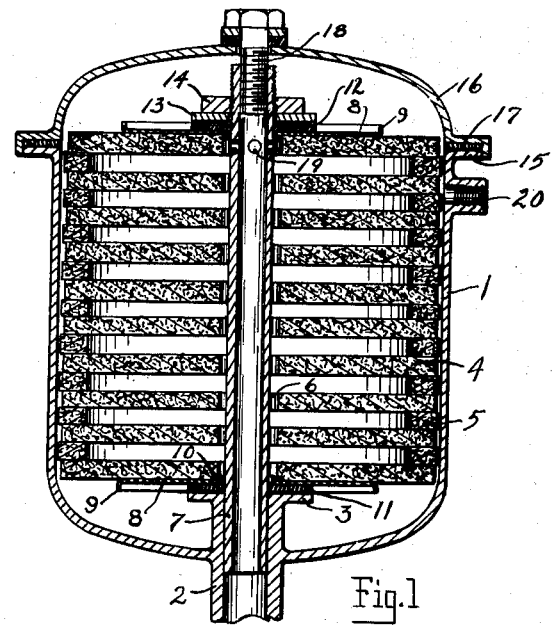
Figure 2:
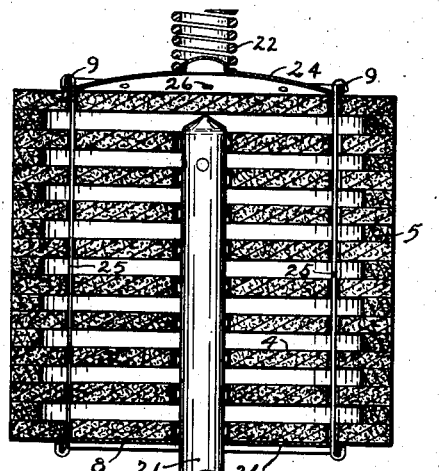
Figure 3:
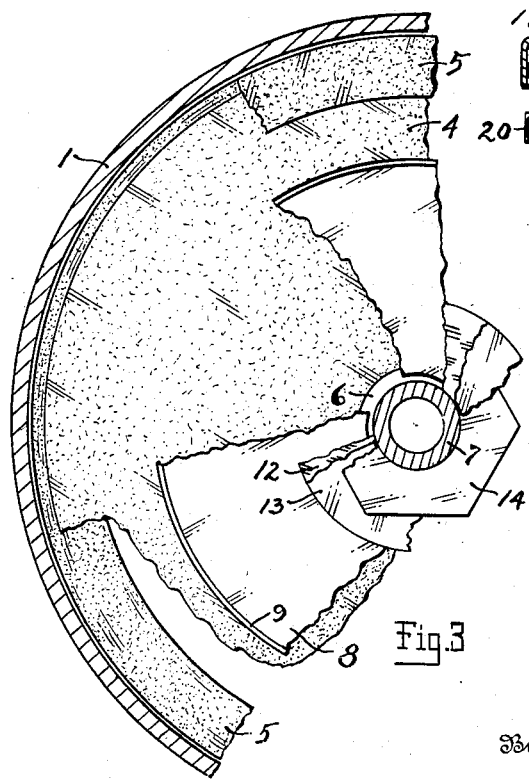
Figure 4:
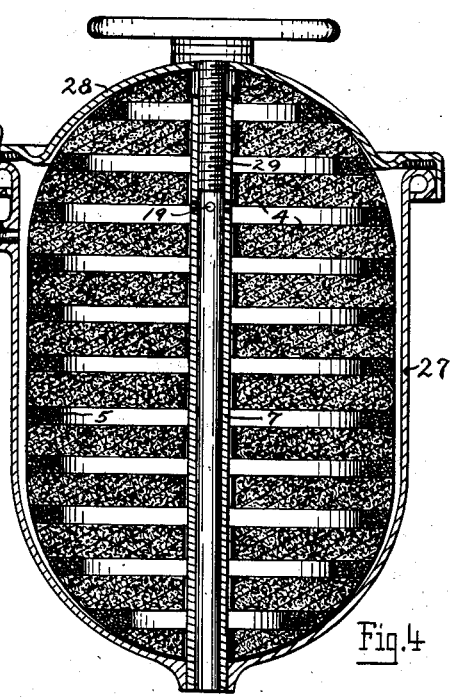
Figure 9:
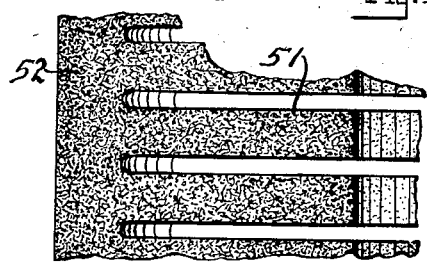
Figure 10:
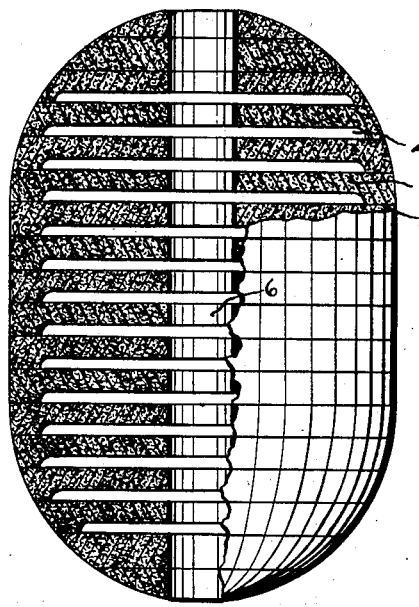
Figure 12:
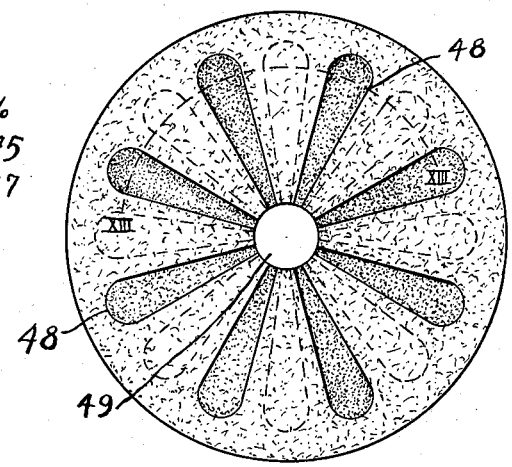
Figure 13:
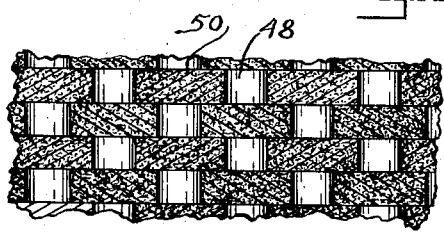
Figure 11:
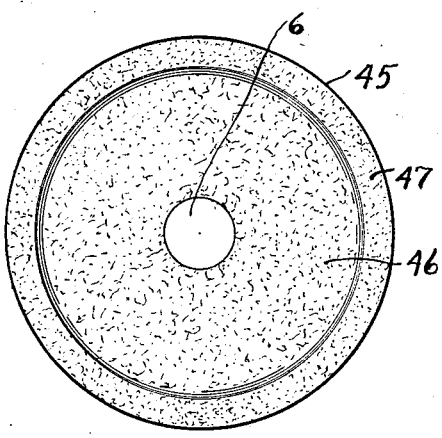
Figure 14:
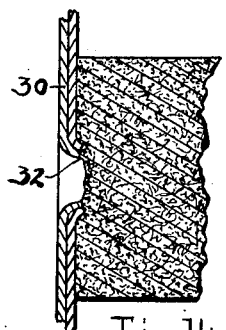
Figure 15:
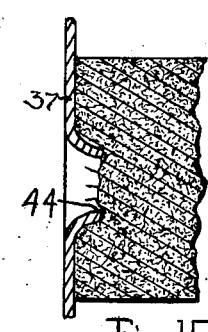

In the accompanying drawings, Figure 1 is a vertical section taken centrally through a casing and a filter element in which separators project outward beyond the outer peripheries of filter discs held apart by the separators; Fig. 2 is a vertical central section through a different form of element in which the separators and discs are flush at their peripheries; Fig. 3 is a fragmentary top plan view of Fig. 1 on a larger scale with parts in section and parts broken away; Fig. 4 is a vertical section through a modified form of casing and of the filter element; Figs. 5, 6, 7, and 8 are vertical sections through filter elements in which the fibrous separators of Figs. 1 to 4 have been omitted; Fig. 9 is an enlarged fragmentary section on an enlarged scale of a filter element in which the outer wall portion and the inwardly extending webs are molded as a single member; Fig. 10 is a vertical section and Fig. 11 is a plan view looking from below of one of the disks of Fig. 10 in which a filter element is built up by assembling disks having the central portion of one face cut away; Fig. 12 is a plan view of a modified form of filter disk; Fig. 13 is a fragmentary vertical section taken along the arcuate line XIII—XIII of Fig. 12; and Figs. 14 and 15 are fragmentary vertical sections on a large scale of certain edge portions of the elements shown in Figs. 6 and 7 respectively.

The cylindrical casing 1 shown in Fig. 1 is provided with an inlet tube 2 which terminates within the casing with a flange 3 forming a seat for a filter element, shown as consisting of a plurality of porous, fibrous disks 4 separated by annular separators 5 which may be of the same fibrous material as that used for the disks. The separators are preferably secured to the disks by a suitable adhesive not affected by the liquid to be filtered. In the plan view shown in Fig. 3, it will be seen that the separators 5 are of greater diameter than that of the disks 4, their edges thus lying closer to the interior surface of the casing I than do those of the disks. A fibrous container under internal pressure may expand outward, but before such expansion can become detrimental, the edges of the separators will engage the casing to prevent any further spreading. Each disk has a central opening 6 to receive a vertical tube 7 which may be welded or otherwise firmly secured within the upper end of the inlet tube 2. The lower surface of the lowermost disk rests upon a reinforcing plate 8 formed with a peripheral flange 9 for greater rigidity and also provided with a punched-up collar 10 of a size to enter the perforation 6 of the lowermost disk. Between the element 8 and the flange 3 is interposed a gasket 11.

After the filter element has been slid down upon the tube 7, a top plate 8, similar in every respect to the one at the bottom, is set upon the upper surface of the top disk and followed by a gasket 12 and a washer 13. A nut 14 upon the threaded upper end of the tube 7 serves to hold the filter assembly firmly in place in the casing 1. At the upper edge of the casing is a flange 15 on which rests the flanged periphery of the lid 16, a gasket 17 between the flanges serving to provide an oil-tight seal when the lid is clamped down by the screw 18 engaged within the upper end of the tube 7.

Liquid to be filtered enters at the inlet 2 and passes up the tube 7, through openings 19 close to the upper disk and out into the spaces between the disks. To escape from this fibrous container, the liquid must pass through or between the fibers which have been compressed to form the disks and separators. The liquid can enter the surfaces of the disks at any exposed area and once through the relatively hard surfaces, it will move radially outward to emerge at the edges of the disks and into the casing which has an outlet port 20.

Whether the liquid passes through the material of the disks or of the separators, any suspended particles will be stopped by the closely packed fibers and the liquid will emerge clean from the very beginning of the use of the filter element. In many other types of filters, loosely packed or open meshed filter material will allow a considerable portion of the finer material in suspension to pass until the coarser particles and the sludge have finally clogged the interstices sufficiently to retain the finer particles, by which time, the filter element is nearly ready to be discarded. Such filters should be regarded as merely strainers during the greater part of the period of their use.

Since the liquid emerging from the fibrous disks in the present filter is free from matter in suspension, the space surrounding the filter element remains clean even when the spaces within the element are completely filled with the matter removed from the liquid. Thus there will be nothing to prevent easy removal of the filter element from the casing when the interior of the element has become so clogged with dirt and sludge that the filter is no longed efficient. When the old element has been removed and discarded, the new element that replaces it acts immediately to remove even the finest particles with no intermediate period of partial filtration.

Figure 6:
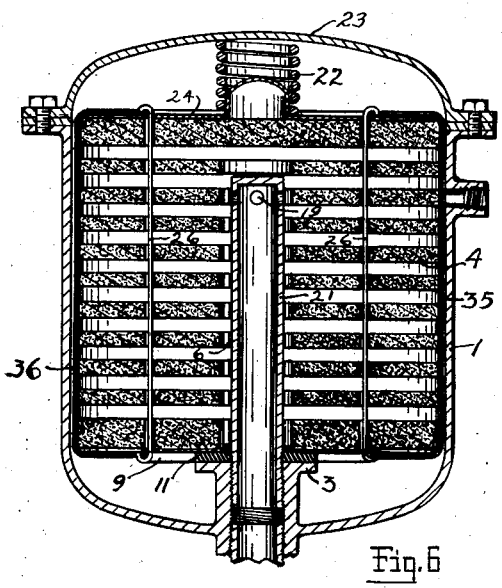

In Fig. 2, a slightly modified form of filter element is shown for use in a casing such as that of Fig. 6, in which the inlet tube 21 does not extend through the upper end of the element, the top disk being imperforate and the element being held down upon the flange 3 by a relatively heavy spring 22 compressed between the lid 23 and the metallic reinforcing plate 24. In the modification shown in Fig. 2, the bottom plate 8 and the top plate 24 are secured together by metallic straps 25, 25, which pass through holes near the edges of the plates 8 and 24 and are hooked over the adjacent peripheral flanges 9. The plates and straps prevent outward movement of the end disks due to pressure of the liquid within the assembly. The reinforcing plates 8 and 24 will both preferably be perforated as indicated at 26 for the escape of oil from the outer surfaces of the top and bottom disks.

In Fig. 4, the disks and separators are shaped for assembly into a filter element having substantially hemispherical ends which engage the inner surfaces of the lower end of the casing 27 and of the lid 28 surrounding the lower end of the tube 7 and the screw 29 to form a liquid-tight joint, so that when the screw 29 is tightened, the end disks act as gaskets. In this form, it will be noted that the entire assembly may be of the same fibrous material.

Figure 5:
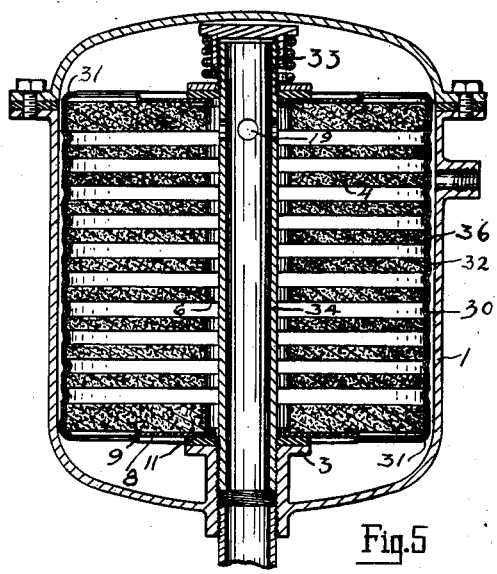

Fig. 5 represents a modification of the filter element in which the disks 4 are held securely in spaced relation by two or more layers of paper 30. This assembly may be made by holding the disks on a suitable mandrel and winding a band of wet paper around their outer edges, the overlapping end of the paper being secured by a suitable adhesive. The band of paper will be wider than the length of the assembly of disks to project beyond both ends of the cylindrical assembly, this projecting portion then being pressed inward by a suitable tool. As the paper dries, it will shrink closely upon the edges of the disks, holding them firmly so that they cannot move toward or from each other. No other separators are necessary. This paper jacket will ave perforations opposite the edges of the disk as indicated at 32 in Fig. 14, the perforations being completely surrounded by the fibrous material and none being made in the paper between the disks. The end disks will preferably be somewhat thicker than the intermediate disks for greater strength in handling. This assembly will have the same metallic reinforcements 8 as in the element of Fig. 1 and the cap 33 screwed on the upper end of the tube 34 will hold the element firmly in place in the casing.

In Fig. 6, the disks are secured together by a cylindrical paper or pasteboard wrapper 35 cemented upon their edges. As in Fig. 2, the upper and lower members 8 are connected by the straps 26 hooked over the edge flanges 9, and the paper jacket will be perforated at 36 in the same manner as is the paper jacket 30 at 32 in Fig. 14.

Figure 7:
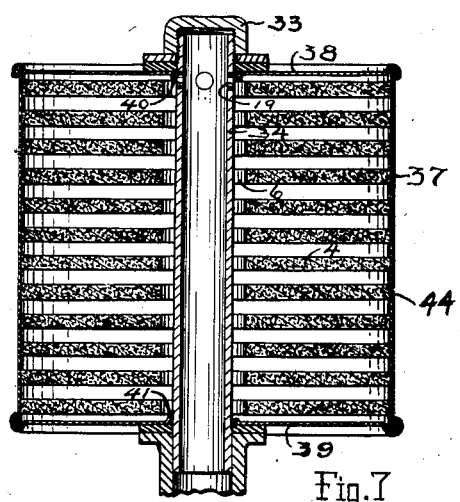

Figs. 7 and 8 show filter elements in which the disks are held within metallic containers perforated at the edges of the disks to allow the filtered liquid to escape. In Fig. 7, the disks 4 are pressed into a metallic cylinder where they are held in spaced relation by the frictional engagement of their edges with the inner surface of the container. Each disk has a central perforation 6 forming a passageway for liquid and the top and bottom disks are spaced from the metallic ends 38 and 39. The pressure of the liquid will therefore be the same on both surfaces of every disk and there will be no tendency for movement of the liquid to cause any shifting of the disks in the container. Both end members will be perforated for the passage of the tube 34 as shown at 40 and 41 and the assembly will be held on the tube by the cap 33 as was the case in Fig. 5. In Fig. 8, the top 42 is not perforated but is formed with a punched up center 43 to receive a spring 22 as in the forms shown in Figs. 2 and 6. In both devices, the metallic shells 37 are perforated as shown in Fig. 15 at various places 44 around the edges of the disks to provide outlets for the filtered liquid from the containers into the casings 1.

In Figs. 10 and 11, a modification of the structure shown in Fig. 4 is illustrated. The central disks 45 of the filter element each have a recess 46 cut in one surface, as by a rotary cutter, leaving an uncut margin 47 to engage against the smooth or uncut surface of the adjacent disk and providing a series of spaces connected by the central perforations 6. The smaller end disks are left of full thickness. The assembly will be held together by cement at the margins. This element will be used in a casing such as that of Fig. 4 with the end disks serving as gaskets when the assembly is clamped in place by the screw 29.

Figs. 12 and 13 illustrate another method by which interior spaces are formed within a group of disks cut from sheets of fibrous material. Each disk will have a plurality of slots 48 radiating from a central opening 49. The disks will be laid upon each other as indicated in section in Fig. 13 and by broken lines in Fig. 12 so that the slots of one disk will lie opposite the solid portions 50 of the disks on each adjacent surface. Since all the slots connect with the central openings 49 liquid entering the center can reach any portion of the exposed side walls of any slot in any disk or of the solid surfaces above or below any slot. Disks so cut may be assembled as in Fig. 10, or they may be placed within containers such as those of Figs. 5 to 8.

The disks thus far described may be cut from sheets of fibrous material such as the various wall boards and the disks then set together in the several ways described. It will also be evident that a structure such as is indicated in fragmentary section in Fig. 9 may be formed by a molding process, the inwardly extending webs 51 being integral with the outer wall portion 52. The element will consist of two or more molded sections cemented or otherwise secured together.

In each of the forms shown and described, the element is a closed container having within its interior a plurality of fibrous, porous, coherent, rigid, self-supporting webs held in substantially parallel spaced relation to provide open spaces between the webs communicating with each other to expose extended surfaces to liquid to be filtered and having the interior spaces communicating with an inlet for a liquid to be filtered under pressure, and, in each form of element illustrated, the liquid passes through opposite surfaces of the fibrous webs and longitudinally of these webs outward from the container. The webs or sheets will be self-supporting in the sense that they will have sufficient coherence and rigidity to maintain their shape and structure in the liquid to be filtered without too great warping or swelling such as to affect their efficiency for the intended use. In such structures as those of Figs. 1, 2, 4, 9, 10, and 12, the whole outer surface is of fibrous material and the filtered liquid can pass through the spaces between the fibers and even through the material of the fibers in some cases to emerge at any point of the outer surface. In the modifications shown in Figs. 5, 6, 7, and 8, the openings 32 or 44 may extend in rows around the entire periphery of each disk to provide sufficient outlet area for the free flow of the filtered liquid. In the paper or pasteboard forms shown in Figs. 5 and 6, considerable oil will escape through the paper shell itself.

It is evident that with equal pressure and equal resistance, the quantity of liquid escaping in a given time will be in proportion to the area of the surfaces exposed to the liquid. In a container of a fixed cubic capacity, an increase of surface of the webs will be attained by increasing the number of webs, which can be done by decreasing the spaces between them, or by using thinner disks while maintaining the spaces. If the spaces are made smaller, the capacity of the element will be decreased so that it will be filled with dirt in a shorter time. If the webs are made thin, the resistance to the flow of liquid may increase sufficiently to offset the increase of surface.

In automobiles, the quantity of dirt to be removed by the filter is directly in proportion to the milage, and the practical consideration of how frequently the filter element is to be renewed will determine the space to be provided within the element. The thickness of the webs will be found by experiment with the various materials to be used for the webs and with the various oils to be filtered. The area will be fixed by the quantity of oil to be filtered in a given time and also by the space available for the filter.

Starting with a clean element, the shortest paths, those offering the least resistance to the flow of liquid, will be the portions of the fibrous webs nearest to the outer surface, and as the liquid passes out at these exits, the dirt left behind will be close to the outer boundaries of the spaces between the webs and as more and more dirt is retained, the pressure of the liquid outward will press the dirt firmly into the outer portions of the spaces, leaving the central spaces last to be filled. But from first to last, the space between the element and the casing has only clean liquid within it and removal of the element is never made difficult by dirt compacted between the element and the casing.

Since the present invention is primarily concerned with the structure of the filter element, no showing has been made of the pump or of the piping system used to circulate the oil. The lubrication system of an automobile usually has a by-pass for the relief of excessive pressure whenever the flow of oil is retarded to a greater degree than is desirable, as when heavier oil is used or when the oil is cold or when the filter element has become filled with dirt and sludge removed from the oil in the process of filtration. In the structures shown in Figs. 2, 5, 6, and 8, the filter element is held upon its seat by a spring which permits the element to be lifted from the seat to allow part of the oil to flow out to by-pass the element whenever the pressure of the oil within the element becomes greater than the pressure holding the element on its seat. If it were not for the action of the spring 22, the pressure of the oil at the inlet would tend to lift the element off the flange 3 and the gasket 11. Whenever the pressure of the oil within the element exceeds the combined pressures of the spring and the weight of the element and its contents, the element will be lifted off the gasket 11 and oil will flow from the openings 19 downward through the openings 6 and out below the bottom of the plate 8 into the casing. The pressure inside the element will still function to drive some oil through the filter and whenever the excess pressure ceases, the spring will return the element again to its seat upon the gasket.

The constructions shown are to be considered as merely illustrative, since it will be evident that many changes in the form, proportions, number of elements, and other details of construction may be made without departing from what is claimed.

I claim:

1. A filter element formed as a container having an outer wall, a plurality of rigid, coherent, self-supporting filter members within the element held in spaced relation with portions of the members in contact with the interior surface of the container wall, the container having an inlet for liquid and the wall of the container having outlets for liquid surrounded by portions of the filter members, whereby liquid entering the inlet will pass through both surfaces of the members and longitudinally of the members and out of the container through the outlets in the wall of the container.

2. A filter element comprising a plurality of sheets of rigid, coherent, cellulose material arranged in spaced relation substantially parallel with each other, one or more strips of flexible material extending around the outer edges of the cellulose sheets and attached thereto to hold the sheets in spaced relation and to form a container for liquid within the spaces between the sheets, the container being provided with an inlet to the spaces between the sheets and the flexible strip having perforations formed therein opposite the interior of the sheets, whereby liquid entering at an inlet may pass through both surfaces of a sheet, longitudinally outward through the interior of the sheets, and out of the container at a perforation.

3. A filter element comprising a substantially cylindrical metallic container, a plurality of circular disks of fibrous material within the cylinder having their edges engaging the interior surface of the metallic container, the disks being held in spaced relation and having portions removed to provide an open passageway for liquid to be filtered, the container having an inlet for liquid communicating with the passageway through the disks, and the wall of the container having outlets for liquid formed therein opposite the edges of the disks, whereby liquid in the container entering the surfaces of the disks will pass longitudinally of the disks and out at the outlets in the wall of the container.

STANLEY MALANOWSKI.

References Cited in the file of this patent

UNITED STATES PATENTS

| Number | Name | Date |
|---|---|---|
| 622,562 | Sutton | Apr. 4, 1899 |
| 629,319 | Maignen | July 18, 1899 |
| 1,410,017 | Kessler | Mar. 21, 1922 |
| 1,794,281 | Dorfner | Feb. 24, 1931 |
| 1,805,450 | Harvey | May 12, 1931 |
| 2,154,565 | Fife | Apr. 18, 1939 |
| 2,269,725 | Malanowski | Jan. 13, 1942 |
| 2,298,980 | Sloan et al. | Oct. 13, 1942 |
| 2,321,985 | Briggs | June 15, 1943 |
| 2,337,470 | Hill | Dec. 21, 1943 |
| 2,337,579 | Walker et al. | Dec. 28, 1943 |